April 15, 1969  W. C. PAGEL  3,438,843
ADHESIVE FILM CONTAINING HEATING ELEMENTS
Filed March 3, 1965
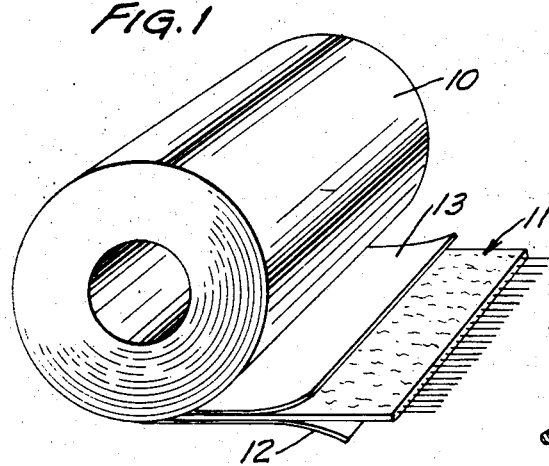
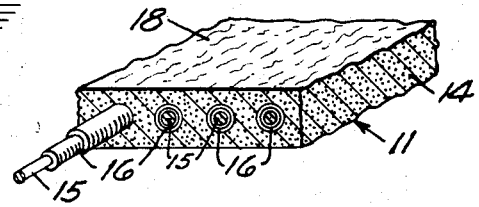
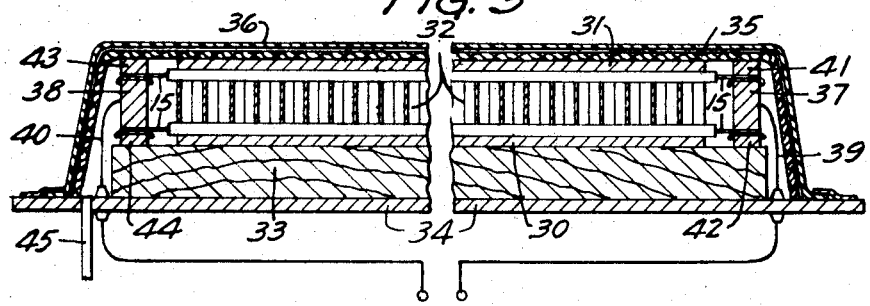
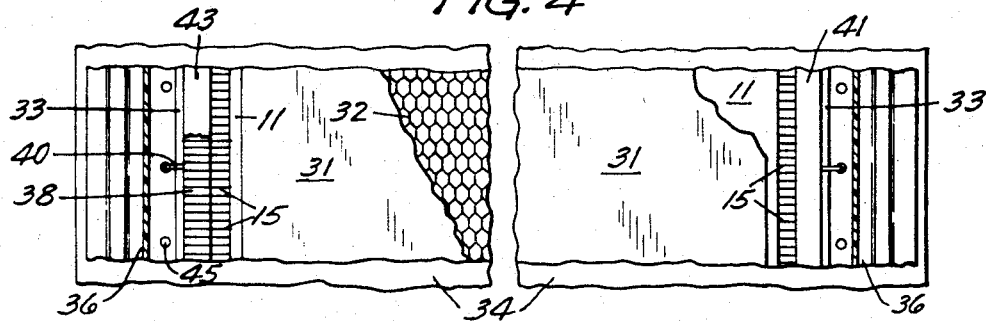
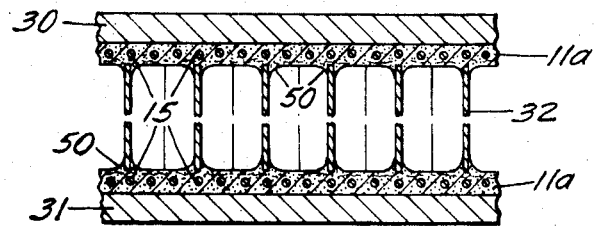
INVENTOR.
WARREN C. PAGEL
BY
*Carpenter, Kinney + Coulter*
ATTORNEYS 3,438,843
ADHESIVE FILM CONTAINING
HEATING ELEMENTS
Warren C. Pagel, North Hudson, Wis., assignor to Minnesota Mining and Manufacturing Company, St. Paul, Minn., a corporation of Delaware
Filed Mar. 3, 1965, Ser. No. 436,869
Int. Cl. B32b 3/14
U.S. Cl. 161—143          4 Claims

ABSTRACT OF THE DISCLOSURE

Resinous adhesive film is supplied with a monolayer of parallel equally spaced fiber-covered insulated resistance wires for uniformly heating the film, e.g. in bonding metal honeycomb to metal panels.

---

This invention relates to adhesive bonding and to materials for use therein. More specifically, the invention relates to novel adhesive sheet materials containing electrical resistance heating elements and to methods of making and using such products. In one particularly significant aspect the invention relates to the formation of strong permanent adhesive bonds between metal surfaces of such large dimensions that more conventional procedures, such as bonding and curing at high temperatures and pressures in an autoclave, cannot be used. The invention makes possible the bonding together of a wide variety of structural elements in substantially any desired dimensions, using heat-bonding and heat-curing adhesives for strong permanent bonding, with uniformly excellent results over the entire bonded area, and without requiring mechanical presses of autoclaves.

The bonding of large areas of metal honeycomb reinforcing materials to the flat surfaces of metal panels, as for example in making light weight reinforced structural members for aircraft, is an example of a particularly difficult adhesive bonding operation for which the products of the present invention have been found especially advantageous. The sections are frequently of such large dimensions as to preclude their assembly and bonding in mechanical presses or autoclaves. Previous attempts to employ internally heated film adhesive materials have been ineffective. Both the metal panel and the metal honeycomb are electrically conductive, so that contact with these surfaces by the electrical resistance heating elements causes shorting and adversely influences the heating effect at the affected area. Attempts to insulate the conductors with thin layers of fabric placed thereover have tended to prevent adequate bonding by the adhesive and have generally been found to be ineffective for the intended purpose. The thin sharp edges of the honeycomb material, under the pressures that must be applied to obtain good uniform contact, tend to push aside or penetrate the fibrous structure of the fabric and make contact with the underlying resistance elements. Increasing the thickness of the fabric unduly increases the total thickness of the adhesive sheet and further reduces its ability to bond to the material surface. Substitution for the fabric of nonporous and nonfibrous insulating films introduces a further problem of impaired cohesion within the structure and disturbs the free flow of adhesive which is required for proper filleting at the honeycomb edge. Increasing the thickness of the adhesive to overcome the last-named difficulty then requires additional heating both for initial bonding and for final curing, and again unduly increases the weight of the adhesive film product.

The present invention provides an adhesive sheet material which is capable of fully uniform internal heating when held under pressure between a flat metal panel and the sharp edges of metal honeycomb reinforcing material. The adhesive when heated first liquefies and wets the metal surfaces, and then cures to provide a tough, hard, strong, heat-resistant bond. The liquid resin flows easily to provide the filleting necessary to anchor the honeycomb edges while still remaining in place across the entire facing panel. Heating is fully adequate to obtain necessary fusion and economically rapid cure, and is fully controllable in structures of both large and small size. Shorting is virtually eliminated, so that all areas are fully and uniformly bonded to the extent possible with the specific composition and materials used.

These and other advantageous results are obtained by incorporating in a film of thermosetting heat-softenable resinous adhesive a central monolayer of parallel uniformly spaced cotton-covered or silk-covered small diameter resistance wires. The film will also preferably contain adjacent one or both major surfaces a thin porous fibrous reinforcing web, all as will be further described hereinbelow. Bonding of metal honeycomb and metal panel surfaces is then accomplished by controlled electrical heating of the intervening film while maintaining the structure under moderate pressure as applied with a vacuum bag or frame. Shorting is avoided. Resin flow and filleting are assured. A strong bond of excellent uniformity is produced.

Adhesives in self-sustaining film form are well known, as are film-forming thermosetting heat-softening adhesive compositions; and any suitable composition having appropriate bonding qualities for the surfaces to be bonded may be employed in the practice of the invention. Epoxy resins modified with various resinous or polymeric plasticizers and with suitable catalysts and curing agents are particularly applicable in the bonding of aluminum as above described, and form a preferred class of compositions. Resinous materials such as novolak or phenoxy resins, or polymers such as polyamide or copolymers of butadiene and acrylonitrile have all been used as epoxy resin modifiers in the successful practice of the invention.

The use of resistance wires embedded in thermosetting adhesive films as a means of internally heating the films has previously involved uninsulated or bare wire. Obvious reasons for such choice are the improved heat conduction thereby obtained, as well as the reduced cost. In the present instance it has been found that the cotton or silk insulation, perhaps because it is fully impregnated with the surrounding adhesive, offers no observable resistance to the flow of heat, while being fully effective against penetration by the sharp edges of the metal honeycomb. The latter effect is particularly surprising in view of the ineffectiveness of other commonly used forms of wire-insulation. Enameled wire, for example, has been found completely ineffective; the metal edges cut or scrape through the enamel coating and cause electrical shorting between adjacent wires regardless of the particular enamel used. Again, wire wound with other insulating fibers, more particularly with synthetic fibers such as glass or nylon, while somewhat improved over the enamel coated wire, is easily shorted when employed in adhesive films and for the purposes here described. On the contrary, adhesive film products made with resistance wire wrapped with a single layer of close-laid natural fiber such as cotton or silk shows greatly improved effectiveness, and when wrapped with two layers applied in opposite directions is found to be almost entirely free of shorting under the conditions here described. DSC (double silk covered) wire is preferred over DCC (double cotton covered) as being of lesser diameter, although the latter type is less expensive.

Although not required in some instances, the fibrous reinforcing webs adjacent one or both major surfaces of the adhesive film of this invention offer a number of advantages. They are particularly advantageous during formation of the film product, as will subsequently be more fully pointed out. They add considerably to the lateral strength of the film. Most significantly, they serve to retain the wires properly located within the film when the latter is subjected to strain conditions likely to cause plastic flow, as in winding the film into roll form. At the same time the fibrous web is sufficiently thin and porous to add very little to the total weight and thickness of the film and to offer essentially no resistance to the flow of the liquid adhesive around the honeycomb edges during pressure application at elevated temperatures. Very thin and open mesh fabric such as scrim cloth, woven glass cloth, flexible knit cotton fabrics and the like are all useful for this purpose. A preferred web is a non-woven structure of three parts of staple "Dacron" polyester fiber and one part of polyester "fibrid", a synthetic paper-making fiber, formed from an aqueous slurry on a paper-making machine as a lacy porous web weighing one-half ounce per square yard.

For purposes of illustration but not of limitation, the preparation and use of a typical adhesive film of the invention will now be described. Proportions are given in parts by weight unless otherwise indicated.

A polyethylene-coated heavy kraft paper is employed as a carrier strip. A thin fibrous porous polyester web as hereinbefore described is placed upon the carrier strip. The two are drawn together across a flat table and beneath a coating knife, and a quantity of adhesive is smoothly and uniformly applied at the knife to a thickness of approximately .007 inch. The adhesive consists of a blend of epoxy resin and rubbery butadiene-acrylonitrile copolymer together with curing agents and activators. The adhesive is further characterized as melting to a thin liquid at about 95° C. and curing in about 20 to 30 minutes at 150° C. to a hard tough solid. It is applied as a viscous paste at about 85° C. and permitted to cool. The adhesive completely impregnates and covers the fibrous web. The film at room temperature is flexible but will crack under a sharp blow, being prevented from shattering by the embedded reinforcing fibers.

Two lengths of the film as just described, and supported on their carrier webs, are passed between heated smooth-surfaced rollers under moderate pressure and in face-to-face position while a number of No. 40 gage double silk covered (D.S.C.) Nichrome wires are fed continuously between the two under sufficient tension to maintain their parallel alignment and at a spacing of eight wires per inch of width. Pressure and temperature are just sufficient to assure flattening and bonding of the adhesive films around the wires. The structure is cooled to room temperature. One of the carrier webs is removed and replaced by a less bulky, inexpensive thin film of polyethylene; the structure is then wound into roll form for storage and shipment, or may be cut into segments and stored in stacks. The total weight of the adhesive film, minus the protective film and carrier web, is approximately 0.085 lb./sq. ft. The caliper is approximately 0.015 inch.

Segments of the adhesive film are employed in the manufacture of a light weight metal panel. The panel consists of two sections of cleaned and etched 20 mil flat aluminum sheet bonded to opposite surfaces of a one-half inch thick section of aluminum honeycomb having $3/16$ inch cells of 2-mil foil. The sections are two feet by four feet. Segments of adhesive film measuring two feet by four and one-half feet are prepared by first heat-softening and removing the adhesive from the wires for a distance of about two inches at both ends of the strips. These end portions are conveniently heated by holding them briefly in contact with a heated metal plate or under a jet of heated air. While still warm and plastic, the adhesive is gently scraped from the wire ends, e.g. by hand scraping with a wooden spatula or with a cloth. The exposed silk insulation and any sub-coating of enamel is then removed from the metal wire by gentle flaming with a torch, after which the segment is ready for assembly.

In assembling the structure for bonding it is found convenient to use a flat steel table having openings for connection with a vacuum pump and additional connections through which lead-in wires are secured. A plywood panel of suitable dimensions is first placed on the table to serve as a heat insulating base. Such a table and base may be of any desired dimensions.

A first segment of aluminum panel is placed upon the plywood. Over this is laid a first segment of the adhesive film, with the free wire-ends extending from the panel at both ends. A narrow strip of aluminum panel placed adjacent each end of the main panel and beneath the free ends of the wires serves as a contact component of the connecting bus bar system. A coextensive strip of flexible aluminum foil may if desired to placed over each strip and beneath the wire-ends to provide improved contact. The segment of honeycomb is placed in position over the adhesive film and is in turn covered with the second adhesive film segment and the second aluminum panel section. A heavier strip of aluminum bar of approximately one-half inch thickness is placed over the previously positioned aluminum strips and the bare wire-ends of the first adhesive film, and beneath the corresponding bare ends of the second film, the latter being then further covered with a strip of aluminum foil if desired and with a second strip of aluminum panel. The aluminum bars are connected, by leads passing through the supporting table, to a controlled source of electric current.

A sheet of porous glass cloth is laid over the entire structure, and over this is placed a slightly larger section of a non-porous flexible film of polyvinyl alcohol, the peripheral areas of the latter lying outside of the entire assembly and in direct contact with the smooth surface of the steel supporting table-top. The glass cloth protects the thin film at the edges and corners of the enclosed structure and permits free passage of air to the pump. The edges of the film will ordinarily be taped or otherwise sealed to the steel surface, although this additional step may be omitted where the outer film is of sufficient softness and pliability.

The vacuum pump is then started and the air exhausted beneath the plastic film to a vacuum of approximately 25 inches of mercury. At this level the pressure of the atmosphere is sufficient to force the outer panels toward the honeycomb uniformly over the entire area, and also to provide full electrical contact between the bus bars and each of the wire terminals; and this pressure is maintained during the succeeding bonding operation.

Prior to completing the assembly as just described, thermocouples are applied at various locations on the outer panel surfaces, and connected to suitable meters by leads passing through the supporting table, so that the temperature of the system may be accurately determined during the heating operation. In the system just described, thermocouples are applied near each corner and at the center of both the top and bottom panels. Voltage is then impressed upon the bus bar connections from an external source as previously mentione, and current flows through the resistance wires to cause a heating effect within the adhesive films. Excellent temperature uniformity is obtained throughout the entire structure, as shown by readings from the several thermocouples varying not more than plus or minus about 10° C. In the specific structure above designated, the initial heating is accomplished at 34.5 volts and 45 amperes. After about six minutes and at an average temperature of approximately 70° C. the adhesive reaches a semi-fluid or plastic state. The current is reduced to 40 amperes at 30 volts, and these conditions are maintained until about 25 minutes at which point the temperature averages approximately 95° C. and maximum fluidity of adhesive is attained. Voltage is now slowly increased until after about 90 minutes a maximum of 38 volts is applied, the current then remaining constant at 52 amperes and the temperature at about 150° C. as the adhesive starts its final cure. Curing is continued under these same conditions to a total of about 150 minutes. The adhesive is now at essentially its maximum tensile strength and toughness, is firmly and uniformly bonded to the aluminum honeycomb and panels, and is capable of withstanding severe mechanical shock as well as temperatures up to at least about 200° C. The leads are then disconnected and the apparatus disassembled. The protruding portions of the adhesive films with the embedded wires are removed, leaving a fully uniformly bonded light weight structural panel.

The materials and operations just described will be further apparent from the appended drawing, in which FIGURE 1 represents the wire-containing fiber reinforced adhesive web in roll form as supplied for storage and shipment;

FIGURE 2 is an enlarged view of a portion of the web with one of the wires extended to show detail;

FIGURE 3 is a representation in cross-section of the panel assembly during the bonding operation;

FIGURE 4 is a partial plan view, with portions cut away to show detail, of the assembly of FIGURE 3; and FIGURE 5 is a detailed sectional representation showing the bonded area between panel and honeycomb.

The roll 10 of FIGURE 1 is made up of the adhesive film 11, together with the carrier 12 and the protective film 13, wound into roll form. The structure of the adhesive film 11 is shown in more detail in FIGURE 2 as consisting of a film-forming resinous adhesive 14 within which is centrally embedded a monolayer of wires 15 each of which is doubly wrapped with silk insulation 16. Adjacent at least one major surface of the film 11 is embedded a fibrous web 18.

The lay-up illustrated in FIGURES 3 and 4 includes upper and lower panels 30 and 31 separated by a honeycomb reinforcing material 32 and by two adhesive films 11. The whole is supported on insulating base 33 which in turn is supported on a table top or similar support 34, and is covered first with a protective insulative porous fabric 35 and with an outer flexible impervious film or blanket 36. The wires 15 extending at each end of each of the films 11 are in contact with bus bars 37, 38 which in turn are respectively connected by leads 39, 40 to a source of electrical energy located beneath the support 34. Pressure contact between wires and bus bars is secured by metal spacer strips 41, 42, 43, and 44. Air is exhausted from beneath the blanket 36 through suitable ducts 45 in the supporting table 34 and leading to a suitable vacuum pump, not shown.

FIGURE 5 schematically illustrates the condition existing within the panel structure after the bonding operation is completed. The panels 30 and 31 are firmly and uniformly bonded to the honeycomb 32 by the intervening cured adhesive films 11a, which as illustrated have formed fillets 50 at the edges of the cells of the honeycomb to provide extremely strong bonding thereto. The wires 15 and the fibrous webs 18 remain embedded within the hardened adhesive and contribute to the strength and shock resistance of the structure.

With an adhesive film approximately as specified hereinabove it has been found possible to use as few as two resistance wires per inch and as many as 100 wires. At the higher number the wires are almost in shoulder-to-shoulder contact and, while contributing to the tensile strength of the resulting bond in the lengthwise direction, unduly increase the weight as well as the cost of the adhesive sheet material and may to some extent reduce the ability of the adhesive when in liquid form to flow from the plane of the wires in bonding to, and forming fillets with, the edges of the honeycomb. The lower number of wires is effective only in those structures which include sufficiently heat-conductive components to accomplish uniform distribution of heat. In the specific structure described, and using aluminum panels and honeycomb of the dimensions given, the number of wires may safely be reduced to half that shown in the specific illustration, i.e. to not more than about four per inch of width, while still obtaining complete uniformity of heating and cure; but for other specific applications, and particularly involving less heat-conductive structural elements, the larger number of approximately eight uniformly spaced resistance wires per inch of width is preferred.

The extremely fine wires herein specified are preferred as providing an adequately rugged structure with sufficient heating capacity and without undue increase in weight. Smaller wires are equally satisfactory as heating elements but are difficult to handle without breakage, particularly during removal of insulation at the terminals. Larger wires are also useful but are less easily conformed to curved panels and are more likely to provide difficulty in winding the adhesive film into roll form and again unwinding the film for use.

In the process of manufacturing the adhesive film as herein described it will be apparent that a fibrous reinforcing layer is embedded within the adhesive material adjacent both major surfaces, whereas for the structure illustrated most particularly in FIGURE 5 only a single fibrous layer is included in each film. Structures of this latter type may be prepared by applying the wires and spreading the fiber-free outer thin coating of adhesive simultaneously over the surface of the previously prepared fiber-containing film on a single carrier web supported on a rounded bedplate so that the wires under tension may be held firmly against the preformed adhesive film surface. Structures of either type may alternatively be prepared by other methods, the adhesive being applied either as a hot melt or in solution or dispersion in an applicable volatile liquid vehicle.

The adhesive employed must be capable of softening to an adherent flowable plastic or liquid state when first heated, and of subsequently hardening to produce a strong bond. The thermosetting adhesives, which harden by chemical reaction, retain their strong bonding properties when later subjected to the same or somewhat higher temperatures and will ordinarily be preferred; but for less drastic use conditions permanently thermoplastic adhesives may be substituted while still realizing many of the advantages of the invention. Various thermoplastic adherent polyamides, copolymers of ethylene with vinyl acetate or ethyl acrylate, polyurethanes, polyvinyl acetals, and polyarylsulfones are illustrative. The use of such adhesives requires that uniform pressure be maintained on the structure throughout the entire heating and cooling operation. For this purpose the vacuum bag method previously described is preferred, particularly for structures of considerable size and complexity; but other systems capable of providing equivalent uniformity and constancy of pressure at similar pressure levels, such for example as pressure bags or sand bags, may be substituted if desired.

Where the wires are described as uniformly spaced and parallel, it will be appreciated that they need not necessarily be laid in straight paths since zigzag or wavy patterns may in some cases be desirable, particularly in overcoming difficulties caused by materials having different linear thermal expansion properties. Similarly where the wires are described as centrally embedded within the film it will be understood that they need not be positioned equidistant from both major surfaces.

It will be apparent that adhesives which liquefy at temperatures considerably different from those hereinabove noted are equally applicable in the structures and practices of the invention, that adhesive films of analogous but specifically different thickness, structure and properties may be provided for different specific purposes, and that other non-inventive variations and changes may be made.

What is claimed is as follows:

1. An adhesive film product suitable for uniformly bonding together a metal honeycomb reinforcing material and a metal panel under moderate pressure and by internal heating of said film, the film product comprising: a thin film of self-sustaining heat-softening resinous adhesive composition; a monolayer of parallel equally spaced insulated resistance wires embedded in and extending the full length of said film; the insulation on said wires comprising at least one close-laid wrapping of natural fiber.

2. An adhesive film product suitable for uniformly bonding together a metal honeycomb reinforcing material and a metal panel under moderate pressure and by internal heating of said film, the film product comprising: a thin film of self-sustaining thermosetting heat-softening resinous adhesive composition; a monolayer of parallel equally spaced insulated resistance wires centrally embedded in and extending the full length of said film; and a thin porous fibrous reinforcing web embedded within said film adjacent a major surface thereof; the insulation on said wires comprising at least one close-laid wrapping of natural fiber.

3. An adhesive film product suitable for uniformly bonding together extended sections of metal honeycomb reinforcing material and metal panel under moderate pressure and by internal heating of said film, the film product comprising: a film of self-sustaining thermosetting heat-softening adhesive capable of melting to a liquid on rapidly heating to about 95° C. and of curing to a hard solid in about one-half hour at 150° C. and comprising a blend of butadiene acrylonitrile copolymer, epoxy resin, curing agents and catalysts; a monolayer of parallel equally spaced double-silk-covered nichrome resistance wires centrally embedded within and extending the full length of said film; and a thin porous fibrous reinforcing web embedded within said film adjacent each major surface thereof; the entire film product being approximately fifteen mils in thickness and being covered on both major surfaces with a removable protective liner.

4. An adhesive film product suitable for uniformly bonding together extended sections of metal honeycomb reinforcing material and metal panel under moderate pressure and by internal heating of said film, the film product comprising: a film of self-sustaining thermosetting heat-softening adhesive capable of melting to a liquid on rapidly heating to about 95° C. and of curing to a hard solid in about one-half hour at 150° C. and comprising a blend of butadiene acrylonitrile copolymer, epoxy resin, curing agents and catalysts; a monolayer of parallel equally spaced double-cotton-covered nichrome resistance wires centrally embedded within and extending the full length of said film; and a thin porous reinforcing web of polyester fibers embedded within said film adjacent each major surface thereof; the entire film product being covered on both major surfaces with a removable protective liner.

References Cited

UNITED STATES PATENTS

| | | | |
|---|---|---|---|
| 3,094,452 | 6/1963 | Von Riegen | 156—275 |
| 3,346,442 | 10/1967 | Carmody | 156—275 |
| 2,783,171 | 2/1957 | Thiessen | 156—275 |
| 2,964,444 | 12/1960 | Lynn | 156—275 |
| 3,047,703 | 7/1962 | Aske | 156—275 |

DOUGLAS J. DRUMMOND, *Primary Examiner.*

U.S. Cl. X.R.

161—68, 406, 184; 338—212; 219—528, 549; 156—179